Aug. 22, 1950  H. T. LANGABEER  2,519,670
POWER PLANT CHARGE CONTROL CIRCUIT
Filed June 22, 1949  4 Sheets-Sheet 2

INVENTOR
H. T. LANGABEER
BY
H. A. Burgess
ATTORNEY

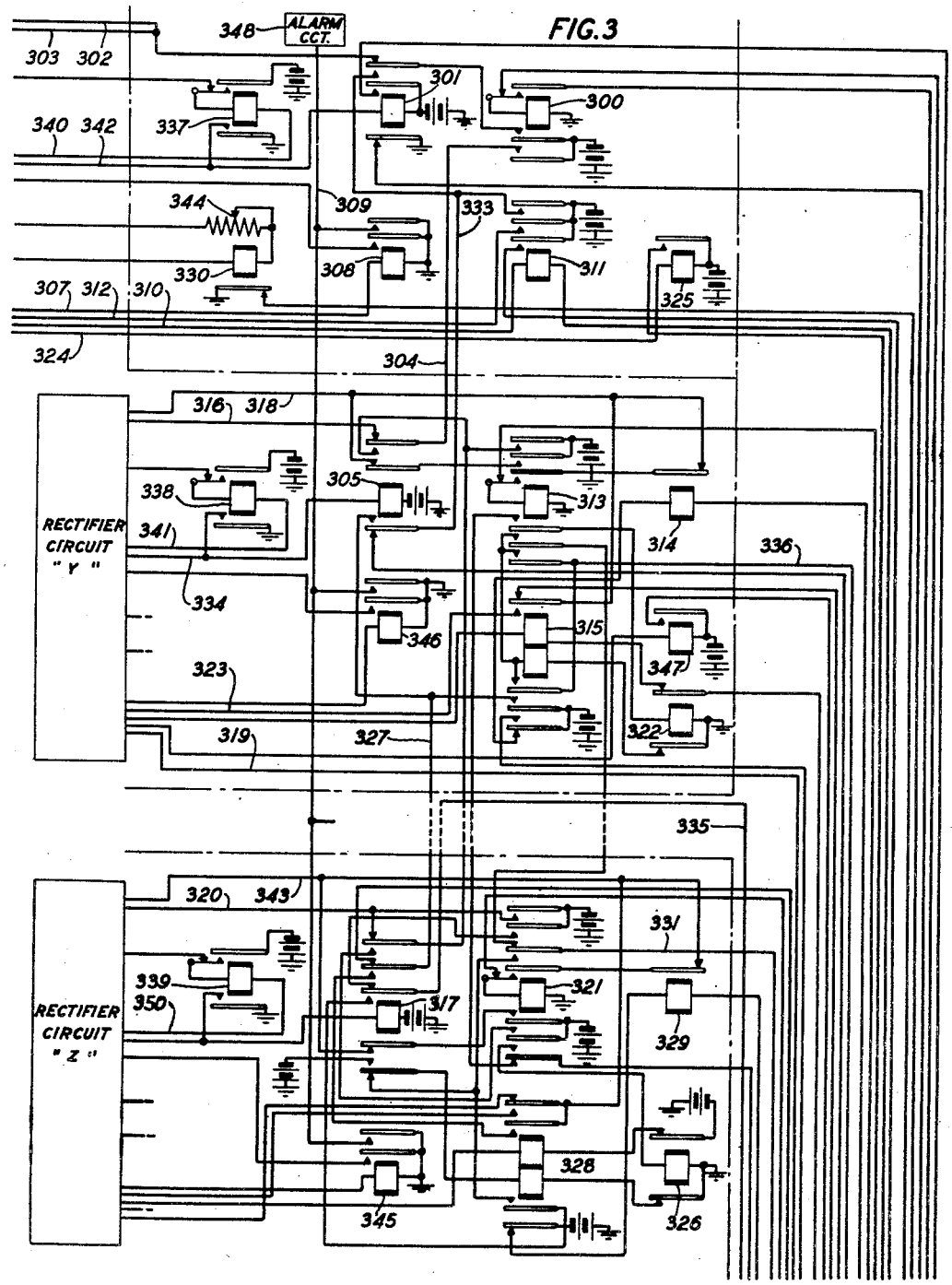

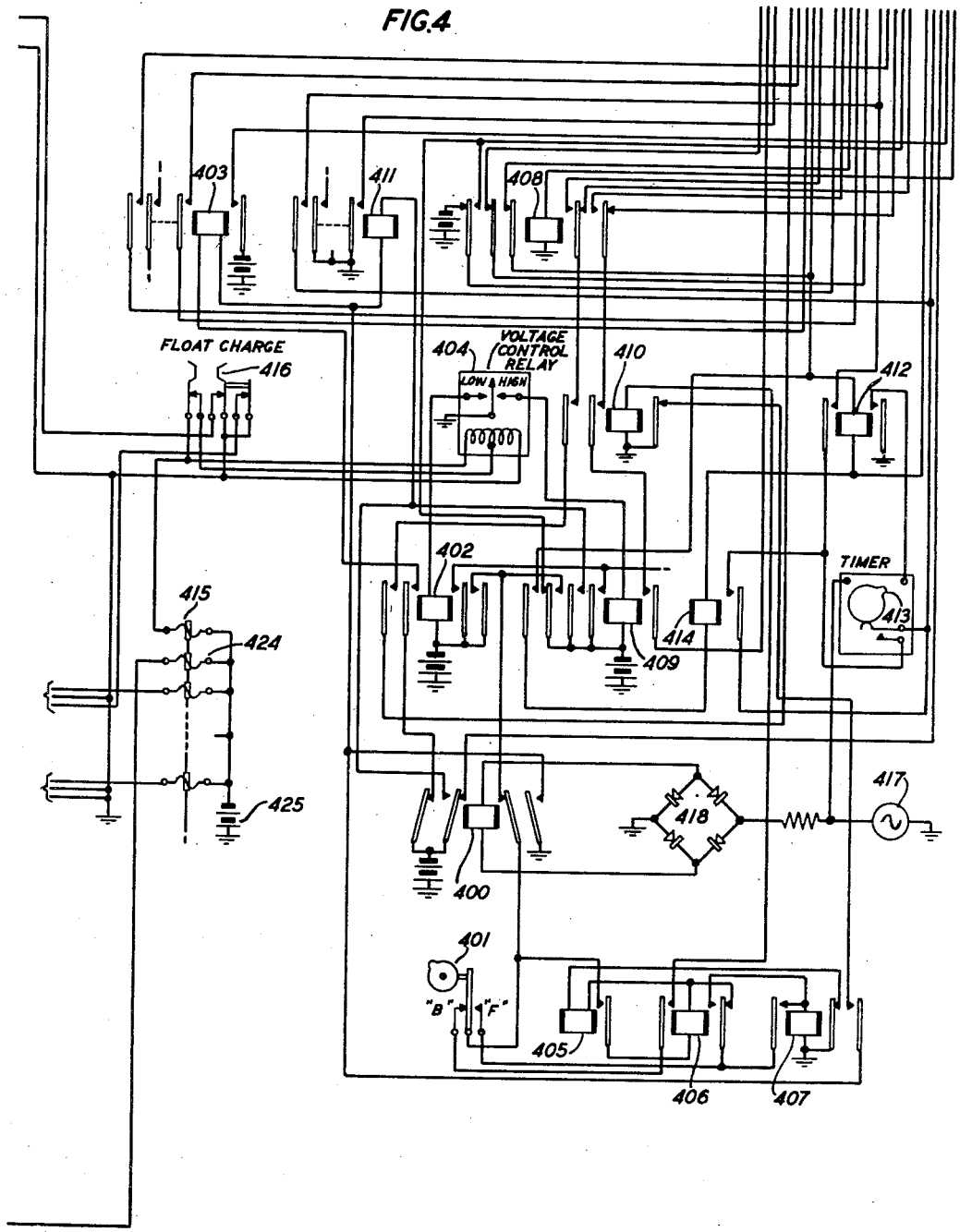

Patented Aug. 22, 1950

2,519,670

UNITED STATES PATENT OFFICE 2,519,670

POWER PLANT CHARGE CONTROL CIRCUIT

Harvey T. Langabeer, Baldwin, N. Y., assignor to Bell Telephone Laboratories, Incorporated, New York, N. Y., a corporation of New York Application June 22, 1949, Serial No. 100,612

9 Claims. (Cl. 171—97)

This invention relates to power plants in which regulated rectifiers used in connection with a floating storage battery are utilized to transfer energy from a power source to a variable direct-current load across which the battery is connected, and in particular to a system for automatically varying the number of rectifiers supplying a load in accordance with load requiremets.

An object of the invention is to vary automatically the number of regulated rectifiers supplying a direct-current load in accordance with load requirements so that, at no time, are there in operation more rectifiers than are necessary to service the load.

Another object is to obtain automatic starting and stopping of members of a plurality of rectifiers under control of battery voltage as determined by load requirements.

A further object is to obtain the operation of a first rectifier as a voltage-control or constant-current control rectifier, and the operation of succeeding rectifiers as constant-current rectifiers.

A still further object is to obtain the transfer of a voltage-control operational feature to a second rectifier when a first rectifier is removed from operation.

Still another object is to prevent the operation of two rectifiers at partial-capacity load output rates when one rectifier has sufficient output capacity to service the load.

It is also an object of the invention to provide automatic starting and stopping of rectifiers under control of load and battery voltages.

It is also an object of the invention to cause the operation of a first rectifier under voltage-control and of succeeding rectifiers under current-control.

It is also an object of the invention to transfer a voltage-control feature of a first rectifier to a second rectifier when the first rectifier is out of service for maintenance purposes or any other reason.

These and other objects and functions of the invention will be more readily understood from the following detailed description made with reference to the accompanying drawings in which the several figures, when arranged in the manner indicated in Fig. 5 constitute a complete power-plant system. The particular power plant embodiment shown comprises three rectifier units which are used to transfer energy from an alternating-current source to a direct-current variable load across which a storage battery is floated.

Referring to the drawings.

Figs. 3 and 4 are circuit diagrams of a voltage-control system which determines when a rectifier should be connected or disconnected from the load, and whether it should operate at partial or full-load constant-current rate. By operation of the system of Figs. 3 and 4 it is possible to transfer a voltage-control feature from a first rectifier to a second rectifier when the first rectifier is removed from service. There should be a circuit in accordance with that of Fig. 3 and Fig. 4 common to all the rectifier units as shown; Fig. 3 also contains block diagrams representative of two additional rectifiers; and Fig. 5 is a schematic drawing and shows the arrangement of the circuits of Figs. 1, 2, 3 and 4 in operational relationship to each other.

Figure 1:
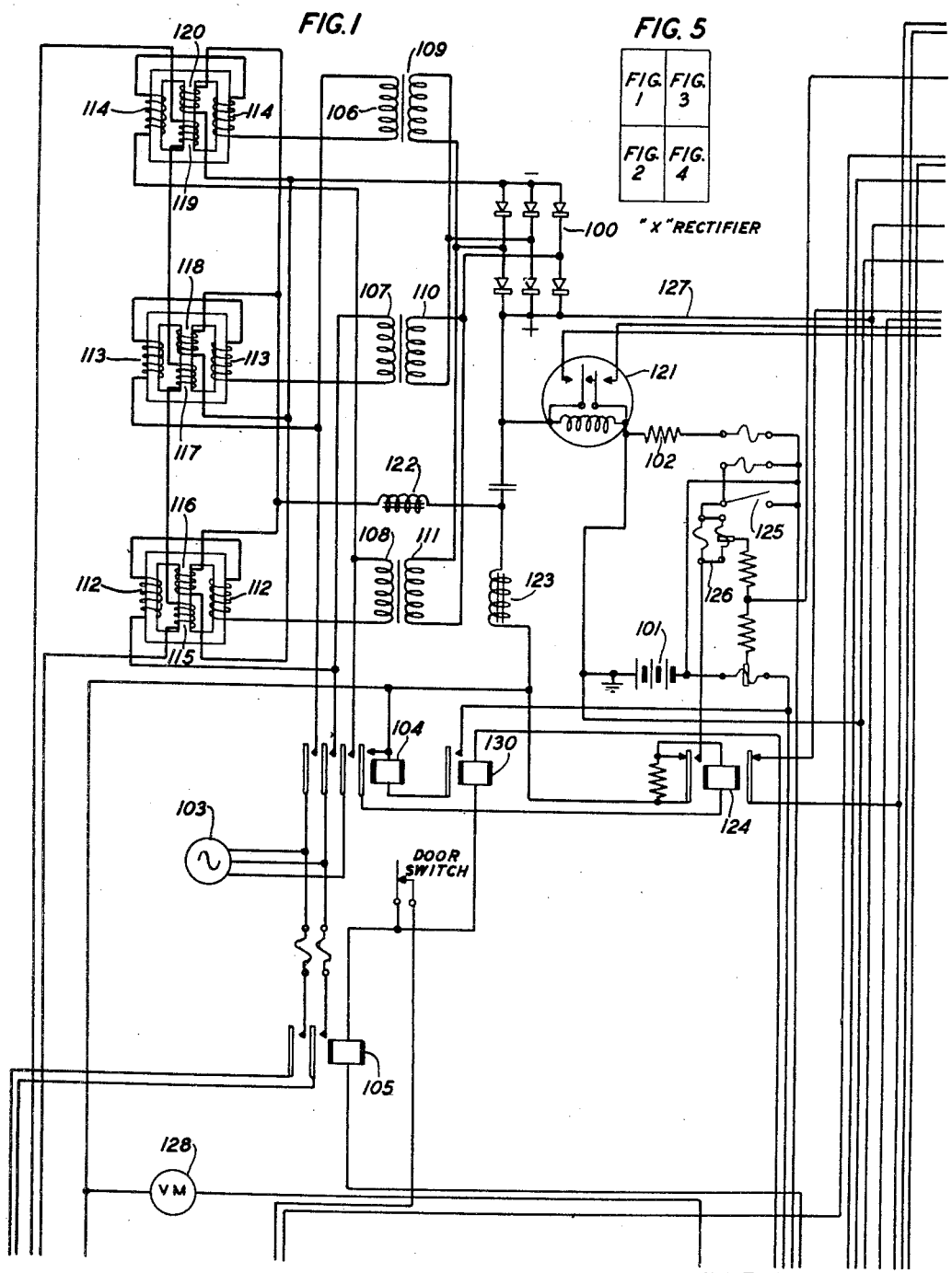
Fig. 1 is a circuit drawing of a rectifier.
Figure 2:
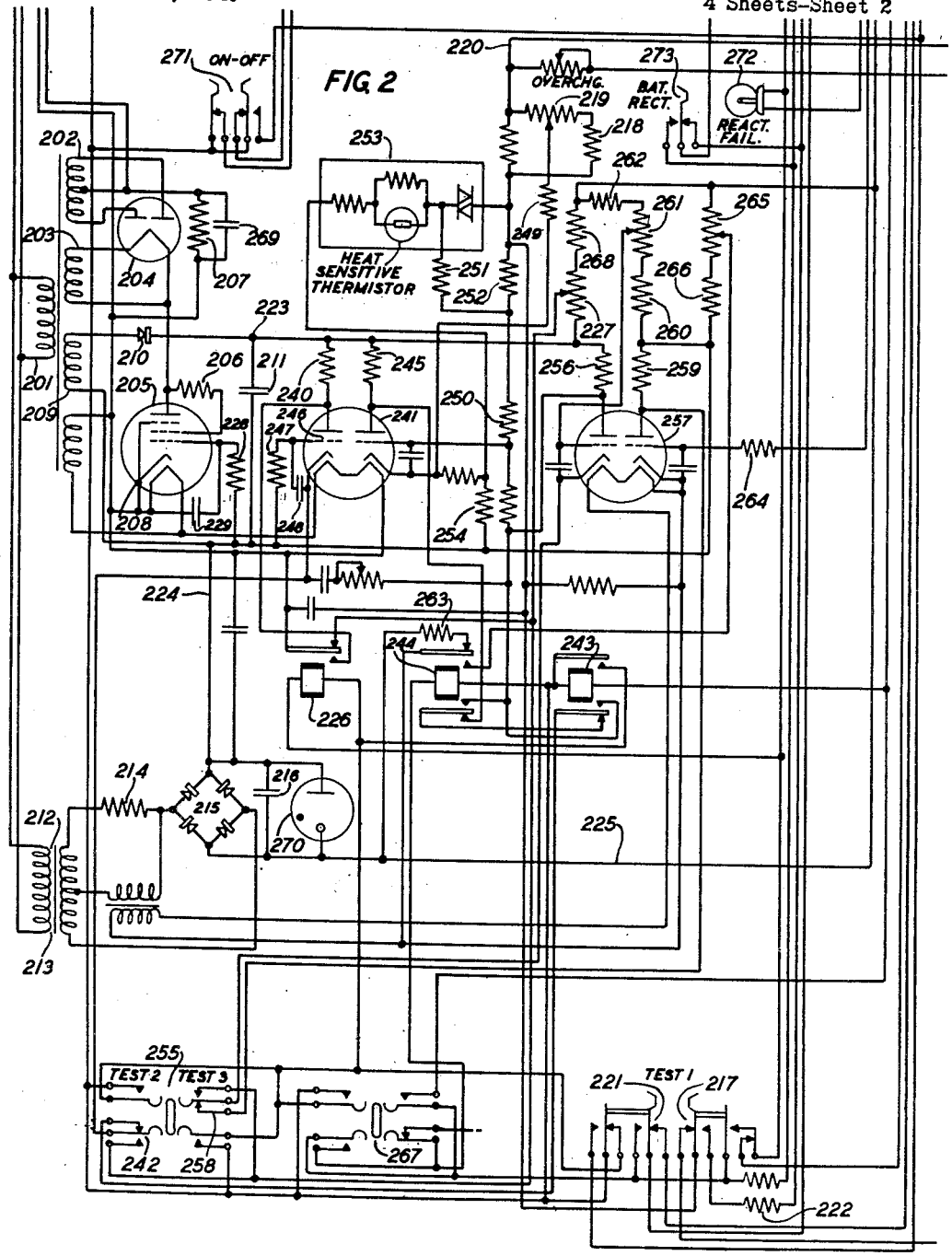
Fig. 2 is a regulator circuit for the rectifier of Fig. 1.

The rectifier units of Fig. 3 which are represented by block diagrams entitled "Y" and "Z" are intended to be similar to a rectifier "X" which is shown in detail in Figs. 1 and 2.

To assist in identification of equipment in the various drawings it may be understood that units shown in Fig. 1 are numbered 1 to 199, in Fig. 2, 200 to 299, in Fig. 3, 300 to 399, and in Fig. 4, 400 to 499.

Before entering into a description of the operation of the system illustrated, a description of the rectifier circuit of Fig. 1 and of the rectifier regulator circuit of Fig. 2 will be undertaken. The equipment shown in Figs. 1 and 2 may be comprised of any suitable units such as those disclosed in the pending application of J. A. Potter, Serial No. 764,490, filed July 29, 1947.

Referring in general to Figs. 1 and 2, in the specific embodiment shown herein, an operational current is supplied through transformers from an alternating-current source to a three-phase bridge rectifier. The rectifier in turn supplies direct current to a load circuit which comprises a varying traffic load connected across a battery. The secondary windings of the supply transformers are delta-connected, and their primary windings are joined in paths which are delta-connected. Three saturable reactors are connected in series with the primary windings, the reactances of these saturable reactors being variable under control of the current supplied to the saturating windings, so that the voltages across the transformers may be controlled and thereby regulate a rectified current which is supplied to the load circuit. The operational current reaches the saturating windings from an auxiliary rectifier through a space-current path of a space-current device or series regulator tube. The resistance of this space-current path is controlled by varying the potential of a regulating electrode with respect to the potential of a cathode so as to determine the amount of current supplied to the saturating windings.

A three-phase bridge rectifier 100 is provided for supplying charging current to a battery 101 across which is connected a varying traffic load 102. Alternating-current power for the rectifier 100 is applied in the circuit from a source 103 through contacts of relays 104 and 105. Battery may be applied to relays 104 and 105 from a connecting circuit of Fig. 2 and thus establish control of the alternating-current input to the rectifier circuit. The current from source 103 is supplied to the rectifier 100 through transformers comprising delta-connected primary windings 106, 107 and 108 and delta-connected secondary windings 109, 110 and 111. Three saturable reactors comprising in part alternating-current windings 112, 113 and 114 are connected between the power source 103 and the primary windings 106, 107 and 108. The reactor with winding 112 also has windings 115 and 116. The reactor with winding 113 also has windings 117 and 118. The reactor with winding 114 also has windings 119 and 120. The positive output of rectifier 100 flows through relay 121 to the positive terminal of the battery 101 which is grounded. The negative output of rectifier 100 flows through windings 120, 118 and 116 in parallel, through reactors 122 and 123, through left innermost contact of relay 124, fuse 126, switch 125 to the negative terminal of the battery 101. The rectified current passing through windings 120, 118 and 116 reduces the impedance of windings 114, 113 and 112 and tends to compensate for the increased voltage drop in rectifier 100 when the charging current is increased. Windings 119, 117 and 115 of the saturable reactors are connected in series and by varying the current through these windings a further control may be effected over the current delivered by rectifier 100.

A number of auxiliary power supplies are involved in the control of the current through the windings 119, 117 and 115 of the saturable reactor. A transformer comprising primary winding 201 and secondary windings 202 and 203 is connected through relay 105 to the main power source. Secondary winding 202 is a tapped winding which has its extreme ends connected to the anodes of a rectifier tube 204. The cathode of tube 204 is connected to the anode of a tube 205 and also to a grid of tube 205 through a resistance 206. The cathode of tube 205 is connected to one end of the winding 119, and in series through windings 119, 117 and 115 to the center tap of winding 202. A resistor 207 and condenser 269 form a protective network across windings 119, 117 and 115. By varying the voltage between resistor 207 and a point 208 of the tube 205 the amount of current passing from the anode to the cathode may be varied to establish control of the output of rectifier 100. In order to describe the remainder of the control equipment it will be necessary to first describe a number of auxiliary power supplies and their connections to each other. A winding 209, half-wave rectifier 210 and condenser 211 comprise a source of voltage and will be referred to as the half-wave rectified voltage control supply. A transformer comprising primary winding 212, secondary winding 213, resistor 214 and full-wave rectifier 215 comprises a second power supply which will be known as the full-wave regulated control voltage supply. A gaseous discharge tube 270 and condenser 216 are connected across the direct-current terminals of this supply to maintain a nearly constant output voltage.

An additional source of control power is obtained from battery 425 through fuse 424, contact 217, resistance 218, potentiometer 219, over lead 220 and contacts of a switch 416 to ground. Suitable voltages may be obtained between the movable contact on potentiometer 219 and the grounded end of battery 425. If, for test purposes, it is desirable to disconnect the battery 101 from the circuit, by operation of a switch 125, the operation of test key 221 will substitute the output of the rectifier through resistance 222 for the battery. The half-wave control supply, the full-wave control supply and the regulated battery supply are all connected in series as follows and starting from the most positive part of the circuit. The positive side of the half-wave filtered control supply is indicated at a point 223. The other terminal of condenser 211 is on the negative portion of this supply and is connected over a lead 224 to the positive side of the regulated full-wave control supply. The negative side of this supply is connected over leads 225 and 127 to the positive terminal of rectifier 100, thence through relay 121 to ground and thence to the potentiometer 219. The remaining part of the equipment, to be described, is connected at several points across any desired part of these three power supplies which are connected in series.

It was stated above that a variable voltage could be applied across resistor 207 and point 208 to control the amount of current passing through the tube 205 and thereby control the amount of current delivered by the rectifier 100. Either of two sources of voltage may be applied to the units 207 and 208 under control of a relay 226. If relay 226 is released a circuit is available from the point 208 of tube 205, through the uppermost contacts of relay 226, to adjustable point on a potentiometer 227, through a portion of potentiometer 227 to the point 223, through the half-wave filtered power supply 210 to resistance 228 and by-passed by condenser 229 to resistance 207. Potentiometer 227 and resistance 268 are in series and are connected to the point 223 to the negative side of the full-wave control supply which creates a voltage drop between point 223 and the adjustable point on the potentiometer 227. Thus by manipulation of the variable point on potentiometer 227 the voltage across units 207 and 208 may be varied as desired.

If relay 226 is operated a voltage path exists from point 208 in tube 205 through the innermost contacts of relay 226 through resistance 240 to point 223, thence to resistance 207 as described above. With the relay in this position the voltage drop across resistor 240 may be utilized to vary the voltage across the units 207 and 208.

Resistance 240 is part of another control circuit which may be in turn controlled from an additional circuit. The circuit by which the voltage drop across resistance 240 is varied comprises a positive voltage from point 223 through resistance 240 to an anode of tube 241, the cathode of the same section of the tube through contacts 242, lower contacts of relays 243 and 244, through resistance 245, and thence returning to the point of origin. A grid 246 of tube 241 is connected through a resistance 247 and by-passed by condenser 248 to the negative terminal of the half-wave filtered control supply. The voltage drop across resistance 240 may, therefore, be varied by adjustment of the voltage drop across resistance 245 which establishes the total voltage drop between point 223 and the cathode of the left section of tube 241.

The voltage across resistance 245 may be controlled in the following manner. A circuit is available from the point 223 through resistance 245 to the right-hand anode of tube 241, thence to the cathode of tube 241, and resistance 249, to a point on potentiometer 219 which has been described above as being part of a circuit across the regulated battery 101. The grid of tube 241 is connected through resistances 250, 251 and 252 to a point on varistor 253 which is provided to maintain a stable source of voltage for this point. The varistor 253 is connected from the negative side of the half-wave filtered power supply through resistance 254, the variator unit 253, through contacts 217 to negative main battery and will compensate for temperature variations and maintain a constant potential drop between the negative end of the half-wave supply and the grid of the right section of the tube 241. It will be understood that adjustment of potentiometer 219 will, through the chain of control, which has been described above, establish an output current from rectifier 100 which, through the action of the control circuits, will increase if the voltage of battery 101 drops, and will decrease if the voltage of battery 101 rises. The voltage available for operation of the left half of tube 241 has been described as obtained from the voltage drop across the resistance 245. If a key 255 is operated to Test 2 position the circuit from the cathode of the left half of tube 241 will pass through the lower left contacts of the Test 2 portion of the key 255 to the variable point on the potentiometer 227, and the output of the rectifier may be controlled manually by selecting a suitable position of the contact on the resistance 227. When this condition maintains the output of the rectifier will remain substantially constant regardless of the voltage of the battery.

Another control for the voltage across the left half of the tube 241 is obtained if key 255 remains in its normal position but relay 243 is operated. In this condition a circuit is available from the cathode of the left half of tube 241, through contacts 242, the second and third lower contacts of relay 243, through a resistance 256 to the positive point 223. The voltage across resistance 240 and the left half of tube 241 is now determined by the voltage across the resistance 256. Resistance 256 is part of another vacuum tube circuit. Starting at point 223 the circuit is completed through resistance 256, the plate and cathode of the left half of a tube 257, through contacts 258 and resistance 259, through the half-wave filtered power supply to point 223. A total voltage across resistanct 256 and the left half of tube 257 is determined by the voltage drop across the resistance 259. The division of voltage drop between resistance 256 and the left half of tube 257 is determined by the voltage between the cathode and anode of the left half of tube 257. A circuit exists from the negative side of the half-wave filtered power supply through resistance 260, potentiometer 261, resistance 262 to the negative end of the full-wave regulated control voltage supply. The grid of the left half of tube 257 is connected to a point on potentiometer 261. In order to describe the control of this tube, the source of voltage drop for resistance 259 must be established. A circuit exists from the negative end of the half-wave filtered power supply through resistance 259, the anode and cathode of the right half of tube 257, through the uppermost contacts of relay 244, a resistance 263, over leads 225 and 127 to the rectifier side of relay 121, thence to the grounded side of battery 101. The grid of the right side of tube 257 is connected through a resistance 264 to the ground side of battery 101. The current passing through relay 121 will cause a voltage drop between the cathode and grid of the right side of tube 257 which will establish a voltage drop across resistance 259. Adjustment of the potentiometer 261 will establish a desired high rate of discharge current from rectifier 100 which will be increased or decreased under control of the voltage drop across relay 121 which is in series with the output of rectifier 100.

Referring again to the voltage drop across the resistance 240 and the left half of the tube 241. Another control voltage can be obtained if key 255 is in a normal position and relay 243 is released while relay 244 is operated. When this condition obtains the circuit path is as follows. The cathode of the left half of tube 241 connects through contacts 242, lower contacts of relay 243, lower inner contacts of relay 244 to resistance 256 as described. The left half of tube 257 is connected to the resistance 259. The tube 257 is connected as described above with the exception that the cathode of the right half of tube 257 is now connected through the upper inner contacts of relay 244 to a point on a potentiometer 265. One end of the potentiometer 265 is connected over the lead 127 to the rectifier side of relay 121. The other side of the potentiometer 265 is connected through a resistance 266 to the positive side of the full-wave regulated control supply. The control supply is connected through leads 225 and 127 to the rectifier end of the relay 121. A constant voltage is impressed across the series-connected potentiometer 265 and the resistance 266. The grid of the right half of tube 257 has been described as connected to the ground point of battery 101. Therefore, by proper adjustment of point of connection on potentiometer 265 a desired low-rate output current may be obtained from the rectifier 100. The low constant current and high constant current rates are interdependent in that the adjustment of the high rate will affect the adjustment of the low rate, but the adjustment of the low rate will not affect the adjustment of the high rate. A key 267 may be operated instead of the relays 244 and 243 in order to obtain the same results as if these relays had been operated.

Relays 104, 105, 124, 130, 243, 244 and 226 are connected to the associated control circuits shown on Figs. 3 and 4 to obtain particular desired conditions of operation of the rectifier 100.

*Auxiliary features*

When a key 271 is operated to the "off" position it causes the release of the relays 105 and 104, and switches ground from its left contact to its right end contact. This condition is needed for features in the connecting control circuit of Figs. 3 and 4 as shall be explained.

Whenever the relay 226 is released, it switches the cathode of the tube 205 from the output of the final amplifier to the central terminal of the potentiometer 227. This permits the manual adjustment of the grid voltage of the tube 205 as an aid in isolating circuit troubles. When the key 221 is operated it will cause the release of the normally operated relay 226, since this relay receives negative direct current in parallel with the relay 104. The key 255 spring combinations, when operated, connect the potentiometer 227 to the grid of the final amplifier, or to the second current amplifier cathode, for manually adjusting the signal to the subsequent stage in order to isolate parts of the circuit. Also, in either Test 2 or Test 3 position of the key 255, ground is connected to cause operation of the relay 226 if it is in a non-operative position.

The rectifier failure lamp 272 is energized when battery and ground is applied to its terminals. This condition obtains by reason of features in the connecting control circuit of Figs. 3 and 4, in conjunction with the operation of the key 221. A voltmeter key 273 permits the observation on the voltmeter 128 of either the battery voltage or the rectifier output voltage.

The purpose of voltage regulation is to hold the voltage supplied to the load to within a few tenths of a per cent of a desired voltage. The purpose of current regulation is to maintain a constant current so that a rectifier may be operated at full load, or at some lower partial output such as half load, without overloading the rectifier when a battery is being charged. The principal factors tending to cause changes in the regulated quantity are: variations in load conditions, input voltage, input frequency, ambient temperature, and drift in the characteristics of components due to aging and heating. Within working limits the regulating rectifier circuit is capable of causing whichever regulated value is selected, whether voltage or current, to be maintained despite the occurrence of random or rhythmically recurring variations in operating conditions. The high inductance of the saturating windings on the saturable reactors of Fig. 1, will delay any change of saturating current so that regulating response correcting output changes will not be instantaneous, but will lag by tenths of seconds.

Voltage regulation

When the control circuit is operating as a voltage regulator, any change in the regulated voltage due to a change in operating conditions will appear in the voltage regulating amplifier as a change of grid voltage. For instance, a decrease in output voltage will produce a somewhat smaller reduction in the negative cathode-grid potential of the voltage regulating amplifier. Due to the gain in this amplifier, its amplified output will cause a much greater reduction in the final amplifier cathode-grid potential; and, further amplified, the signal which originated as a slight reduction in output voltage will reduce considerably the negative cathode-grid voltage of the tube 205 in the saturating power supply. The resulting change in rectifier output will be an increase in voltage toward the regulated value.

Current regulation

Under certain circumstances of power plant operation it is desirable to operate the rectifier at constant current regulated to within a close percentage of the full load rating. The connecting control circuit of Figs. 3 and 4 selects current regulation by causing operation of the relay 243 so as to connect the output of the current-regulating amplifier to the final amplifier grid circuit, and to disable the voltage-regulating amplifier by disconnecting it from the final amplifier. When the circuit is so connected any change in operating condition tending to change output current will also appear in the current-regulating amplifier. A reduction in output voltage will increase output current, and the IR drop across the winding of relay 121 will increase proportionately. This change appears as an increase in the negative cathode-grid potential of the first current-regulating amplifier stage; and, amplified progressively, produces an increase in the cathode-grid potentials of each of the succeeding stages as follows: the second current amplifying stage; the final amplifier; and the tube in the saturating power supply. The resulting decrease in saturating current causes a reduction in the output to correct the current to the desired value.

To regulate the output current at the lower rate, associated with the potentiometer 265, the connecting control circuit of Figs. 3 and 4 causes the operation of the relay 244. Current regulation at this lower output rate is performed in the same manner as for the full-load rate; but the cathode-grid circuit of the first current amplifier is modified to accommodate the new condition by the top contacts of the relay 244.

Charge control circuit

To recapitulate, the figures are identified as follows: Fig. 1 is a rectifier and Fig. 2 is rectifier control equipment required with the rectifier. Figs. 1 and 3 together form part of a system comprising an X first rectifier, Y second rectifier and Z third rectifier circuit. Figs. 3 and 4 together are a voltage-control circuit which selects the particular rectifier to be regulated and determines when charging conditions should be varied in accordance with variations in a traffic load. One Fig. 3 circuit and one Fig. 4 circuit are required for all the rectifiers in an installation.

General description of operation

The rectifiers X, Y and Z associated with the control circuit of Figs. 3 and 4 operate on a constant-voltage or constant-current basis. The rectifier X, the detailed circuits of which were shown and described in relation to Figs. 1 and 2, is operated on a constant-voltage basis so long as its output is less than its full-load ampere rating. When the load on the X rectifier increases to its full-load ampere rating, an associated ammeter relay closes its "high" contact and through the charge-control circuit, of Figs. 3 and 4, causes the rectifier X to transfer to constant-current operation. The current output will be maintained to full-load ampere rating until the output of the particular rectifier, plus that of all operating succeeding rectifiers Y and Z, exceeds the load requirements, at which time the X rectifier will again transfer back to constant-voltage operation. Succeeding rectifiers Y and Z are operated on either a partial output or full-rate constant-current basis. When a succeeding rectifier is first connected to the load it will operate at partial output constant rate. When the load builds up to such a value that additional output is required the charge control circuit will function and cause the rectifier to operate at full-rate constant current. Likewise, as the load decreases, succeeding rectifiers Y and Z are transferred from full-rate to partial output rate constant current, and then are disconnected from the load as the load requirements decrease. It will be understood that any suitable value for partial output rate, such as a half or quarter-rate value, can be utilized.

The Y rectifier of Fig. 3, of the rectifier plurality is designed so that it may operate as either a constant-current or constant-voltage rectifier in accordance with the circuit of Figs. 1 and 2. Normally, the Y rectifier is operated as a constant-current rectifier and is only operated as a constant-voltage unit when the X rectifier is removed from service for maintenance purposes or other reasons. If the rectifiers X and Y are the only ones designed for constant-voltage operation, both rectifiers should not be removed from service at the same time.

The voltage-control circuit of Figs. 3 and 4 determines when a rectifier should be connected or disconnected from the load and whether it should operate at partial output or full output constant-current rate. It also transfers the voltage control from the X rectifier to Y rectifier when the X rectifier is removed from service.

A preliminary summary of the functions of some of the control relays may be of assistance in studying in detail the specifications and drawings.

Operation of a relay 300 prepares a rectifier X for operation. When the output from the rectifier X builds up to full-ampere output the operation of a relay 311 will cause X to operate at full-ampere output. The operation of a relay 409 will release the relay 311 and cause rectifier X to transfer from constant-current operation to constant-voltage control.

When a relay 313 operates it locks operated under control of a relay 305, and causes the rectifier Y to operate at partial output rate and also prepares a rectifier Z for possible future operation. Operation of a relay 315 will cause the rectifier Y to operate at full-load ampere output.

Operation of a relay 321 causes the rectifier Z to operate at a partial output ampere output rate. Operation of a relay 328, following the operation of relay 321, will cause the rectifier Z to operate at full-load ampere output.

Also associated with the charge-control circuits of Figs. 3 and 4 is a common timing circuit which together with a voltage-control relay 404 determines when the relays 403, 411, 402, 409 and 410 should operate. The operation of this timing circuit is as follows: An interrupter 401, which is a motor driver timer, operates continuously. A revolving cam on the interrupter 401 permits the operation of a B contact for a period of 26 seconds out of a 30-second cycle. During a 4-second B contact open period the revolving cam on the timer 401 permits the operation of an F contact for a period of 2 seconds.

When the voltage-control relay 404 closes its left and "low" contact a relay 402 operates to ground on armature of relay 404 and connects battery through its right end contact, right innermost contact of the relay 400 to the central armature contact of the interrupter 401. When the interrupter 401 closes its F contact a circuit is completed through right outermost contact of relay 406 and winding of relay 405 to ground on right innermost contact of relay 407, and this circuit causes the relay 405 to operate. When the interrupter 401 opens its F contact the relay 406 operates in series with the relay 405. If the "low" contact of the voltage-control relay 404 remains closed, the relay 406 completes a circuit through left inner contact of relay 406 to operate the relay 410, as soon as the timing interrupter 401 closes its B contact. The relay 410 operated completes a circuit from battery on the top innermost contact of a relay 311, through right innermost contact of relay 408, left innermost contact of relay 410, left outermost contact of relay 402, and thence over a lead 331 to the last operating rectifier unit. If the "low" contact of the voltage-control relay 404 remains closed when the interrupter 401 again closes its F contact the relay 407 will operate through the right innermost contact of relay 406, and will release the relays 405 and 406, and cause the relay 403 to operate from battery on left outermost contact of relay 400, left innermost contact of relay 402, winding of relay 403, right outermost contact of relay 407, to ground at relay 410. As soon as the timing interrupter 401 opens its F contact the relays 407 and 403 will release. When the voltage-control relay 404 closes its "high-voltage" contact the operation of the control circuit will be similar to that described above except that relays 409 and 411 will operate instead of the relays 402 and 403. Relays 402 and 403 operate on the low-voltage condition described. Relay 409 operates to ground on relay 404, relay 411 operates to battery on the second innermost left contact of relay 409, through winding of relay 411, outermost right contact of relay 407, to ground at relay 410.

If the voltage-control relay 404 should close its "high" or "low" contacts and then open them again at any interval during the cycle described above, all operated relays, other than the relay 400, will release immediately and restore the control circuit to normal.

In the event of alternating-current power failure the relay 400 will release, and in turn will cause the release of any operated relay, other than the relay 411 which will operate and remain operated until the alternating-current service is restored. The circuit for operation of the relay 411 comprises ground from right outermost contact of relay 400, winding of relay 411 to battery through second innermost left contact of relay 400.

*Normal operation of the rectifier charge control circuit*

Assume that the keys on the rectifiers X, Y and Z are in normal and operating positions. When the alternating-current service from source 417 is applied through varistor bridge 418, a relay 400 will operate and a motor which is used to actuate the timing interrupting device 401 will be energized. The varistor bridge 418 and relay 400 form a no-voltage circuit which releases in the event the alternating-current service supply should fail. The release of relay 400 causes the release of the control relays, associated with the rectifier units X, Y and Z, that were operating at the time of the service failure and thereby insures that these rectifier units X, Y and Z will restart in their proper sequence upon restoration of the alternating-current supply. If the voltage of the battery 101 is low the winding of relay 402 will connect to ground on the armature of relay 404 and relay 402 will operate and cause the voltage-control circuit to function and operate a relay 403 through the contacts of relay 400. When the relay 403 operates, battery from its right contact, through upper contact of a relay 300, will operate the relay 300. The relay 300 locks operated to battery through the left innermost contact of relay 400 and under control of the relay 400. The relay 300, operated, completes a circuit from battery through its innermost lower contact, thence through upper outermost contact of a relay 301, and over leads 302 and 303 to the X rectifier circuit and causes the circuit to function and start the rectifier X. The relay 300, operated, also connects battery through its lowest bottom contact, thence over a lead 304, through uppermost contact of a relay 305, and over a lead 316 to the rectifier Y, and causes this rectifier to energize and prepare for possible future operation. Battery from the rectifier X over a lead 307 operates a relay 308, which through its innermost upper contact connects ground over a lead to the X rectifier circuit, and connects ground through its uppermost contact over a lead 309 to an alarm circuit 348. When the rectifier X connects to the load, battery is removed from the lead 307 and the relay 308 releases. If the rectifier X does not connect to the load in a predetermined time, ground over the lead 309 to the alarm circuit 348 can cause an audible and/or visual alarm to become energized in order to alert the maintenance forces.

When the output of the X rectifier builds up to full-ampere rating, ground over a lead 310 to battery on second outermost left contact of relay 409, operates a relay 311, which through its middle upper contact connects battery over a lead 312, and causes the rectifier X to operate as a constant-current rectifier at full-load ampere rating.

As the load continues to increase, the battery voltage will decrease and when it decreases to the particular value for which the voltage-control relay 404 is adjusted, the relay 404 will close its "low" voltage contacts and cause the operation of the relay 402. The relay 402, operated, will in turn, as explained, through the interrupter 401, cause the relays 405, 406, 407 and 403 to operate. When the 403 relay operates a circuit will be completed from battery, through top contact of relay 311, bottom contact of relay 305, outermost left contact of relay 403, innermost top contact of relay 313, and winding of relay 313 to ground. This circuit will cause the operation of the relay 313. The relay 313, operated, will lock operated through its lowest top contact, contact of relay 314, and innermost top contact of relay 305, and through its own top central contact to battery. The relay 313, operated, also completes a circuit from battery through its second outermost top contact, innermost top contact of relay 305, and thence over the lead 318 to Y rectifier. This circuit will cause the rectifier Y to function and connect to the load in the same manner as outlined above for the rectifier X. At the same time battery, through second outermost top contact of relay 313, innermost top contact of relay 305, outermost top contact of relay 315, innermost left contact of relay 408, thence over lead 319 to rectifier Y, will cause this rectifier to operate at a predetermined partial output ampere rating. The relay 313, operated, also completes a circuit from battery through its outermost top contact, outermost top contact of relay 317, thence over lead 320 to Z rectifier, and will alert this rectifier for possible future operation.

The increased charging capacity due to the addition of the Y rectifier will cause the battery voltage to increase, and when the voltage-control relay 404 closes its "high-voltage" contacts the relay 409 will operate and through the operation of its upper contact will remove battery from the operating lead and will cause the release of the relay 311. Release of relay 311 transfers the rectifier X back to voltage-control and thereby allows the rectifier X to correct its output to maintain the proper battery voltage.

When the output of the rectifier X builds up again to full-load ampere rating, the relay 311 will operate and transfer the rectifier unit X to constant-current operation. When the battery voltage decreases to a value where the voltage-control relay 404 closes its "low" contacts, the relay 402 will operate and connect battery to the moving contact spring of the interrupter 401 which in turn through its chain of timing relays will operate a relay 410 as described.

When the relay 410 operates, a battery circuit will be completed through its contacts, from battery on innermost top contact of relay 311, third outermost right contact of relay 408, left outermost contacts of relays 410 and 402, through third outermost top contact of relay 321, second innermost lower contact of relay 313, through the primary winding of relay 315, and through the bottom contact of relay 322 to ground. This battery circuit will operate the relay 315 and will connect battery through second outermost top contact of relay 313, innermost top contact relay 305, innermost top contact relay 315, to lead 323, and will cause the rectifier Y to transfer from a partial output rate to a full-load constant-current output rate. The relay 315, operated, will lock operated through its secondary winding under control of the relays 322 and 408. The increased charge current of the rectifier Y will cause the battery voltage to rise, and the voltage-control relay 404 will close its "high" contact and will release the relays 402, 405, 406, 410 and operate the relay 409 which in turn will cause the release of the relay 311. The relay 311, released, will cause the rectifier X to restore to voltage-operation and correct its output to maintain the proper battery voltage.

When the rectifier X again builds up to full-load ampere output, and the battery voltage decreases to the value at which the voltage-control relay 404 closes its "low-voltage" contacts, the rectifier Z will start and connect to the load at a partial output constant-current rate in the same manner as was described above in relation to the rectifier Y. When the relay 321 operates, the relay 315 is locked operated over a circuit from battery on second outermost top contact of relay 321, second innermost top contact of relay 317, second innermost left contact of relay 408, and innermost lower contact of relay 315, and through the winding of relay 315 to ground on lower contact of relay 322.

As the office load decreases the output of the rectifier X will be decreased and when it decreases to a minimum load, ground over a lead 324 will operate a relay 325. As the load continues to decrease the battery voltage will increase and when the voltage relay 404 closes its "high-voltage" contact the relay 409 will operate and connect battery to the moving contact of the timing interrupter 401 which in turn will operate the relay 410. The relay 410, operated, completes a circuit from battery on top contact of relay 325, right end contact of relay 408, innermost left contact of relay 410, right contact of relay 409, second outermost lower contact of relay 321 and through the winding of a relay 326 to ground, thus causing the operation of relay 326 and the release of the relay 328. Release of relay 328 causes the rectifier Z to transfer from a full-load output to a partial output constant-current rate. This reduction in battery charge capacity will cause the voltage-control feature of the X rectifier to function and correct the battery voltage.

As the office load continues to decrease the X rectifier will decrease its output, and when it decreases its output to a minimum, ground over the lead 324 will operate the relay 325. When the battery voltage increases, the voltage-control relay 404 will close its "high-voltage" contact and will operate the relay 409. The relay 409, operated, completes a circuit to the timing interrupter 401 and causes it to function and operate the relays 405, 406, 410 and 326. Since the relay 326 has released prior to this action there will be no change in the output of the Z rectifier. Since the relays 405 and 406 are operated, at the instant that the interrupter 401 closes its right F contact a second time, the relay 407 will operate and by its operation will release the relays 405, 406 and 410. The relay 410, released, will complete a circuit from ground through its right contact, outermost right contact of relay 407, winding of relay 411 and second innermost left contact of relay 409 to battery, and will cause the operation of the relay 411. The relay 411, operated, connects ground through its contacts, winding of relay 329 to battery on bottom contact of relay 328 and thus will cause the operation of a relay 329 which in turn will cause the release of the relay 321, will remove battery from the lead 320 to the rectifier Z and will cause the rectificer Z to disconnect from the load. In the meantime, the timing interrupter 401 continues to operate and as soon as its right F contact opens, the relay 407 will release and in turn will cause the release of the relays 411 and 329. When the rectifier X corrects both its output and the battery voltage, the relay 409 will release.

As the office load continues to decrease, the output of the rectifier Y will be transferred from a full-load rate, to a partial output rate. When the office load decreases to a value which causes the release of relay 330, (in X rectifier circuit), ground through the lower contact of this relay, through the winding of relay 412, innermost left contact of relay 408, second innermost top contact of relay 315, lowest top contact of relay 305, and to battery through second outermost top contact of relay 313, will cause the operation of the relay 412. The relay 412, operated, completes a circuit for operating a motor which drives a timer interrupter 413, and when the timer 413 closes its contact, battery from outermost lower contact of relay 315 is connected in a circuit to operate the relay 314, through left contact of relay 412, springs on timer 413 to ground on the bottom contact of relay 301. The operation of relay 314 will cause the release of the relays 313 and 412, and also cause the rectifier Y to disconnect itself from the load circuit. If at any time during the period that the relay 412 is operated the relay 409 should operate, a relay 414 will operate to short-circuit the timer springs of interrupter 413 and thus permit the immediate operation of the relay 314.

With the rectifier Y disconnected, the rectifier X will regulate its output automatically in order to maintain a proper battery voltage.

The functions of relays 345 and 346 are similar to those of the relay 308, and the functions of relay 347 are similar to those of relay 325.

*Removing a charging unit from service*

When "on-off" key 271 or "normal-test" key 221 of the X rectifier is operated to the "off" or "test" position, ground over the lead 342 will operate the relay 301. By the opening action of the topmost contact of relay 301 battery will be disconnected from the leads 302 and 303 to the X rectifiers, and the relay 301 will connect battery through its second outermost top contact to a lead 333, and will cause the rectifier Y to connect to the load, if it has not already done so. At the same time, battery through lowest top contact of relay 301 will operate the relay 408, and the operation of relay 408 will transfer the rectifier Y from a constant-current unit to a voltage-regulated unit to replace the rectifier X. When this condition is maintained the rectifier Y will operate in the same manner as was described in relation to the rectifier X. When the keys 271 and 221 are restored to their "normal" positions, the relay 301 will release and the rectifier X will restart as a voltage-regulated unit and will cause the transfer of the rectifier Y from voltage-regulation back to constant-current operation.

When the "normal-stop" or "normal-test" key on the Y rectifier is operated to the "stop" or "test" position, ground over the lead 334 from rectifier Y will operate the relay 305. Through the opening action of the outermost and innermost top contacts of the relay 305 battery will be disconnected from the leads 318 and 316 to the rectifier Y. Operation of the relay 305 connects battery from innermost lower contact of relay 300, second outermost top contact of relay 301, through innermost lower contact of relay 305 to lead 327 to the succeeding charging rectifier unit Z. If the rectifier Y was in operation at that time it was disconnected from service, the rectifier Z will start operation and will assume the load that the rectifier Y was servicing. Operation of the relay 305 through opening action of its lowermost top contact, also disconnected battery from the contacts of the relay 314 and caused the release of the relay 313.

When the keys on rectifier Y are restored to their "normal" positions battery is removed from the lead 334 and the relay 305 will release and allow the rectifier charge unit Y to restart in a normal manner as soon as the relay 403 operates. In the event that a succeeding rectifier charge unit Z is in operation, battery will be connected through second outermost top contact of the relay 321, second innermost top contact of relay 317, through lead 335, second innermost left contact of 408 relay, through lead 336, outermost lower contact of relay 313, winding of relay 315, through lower contact of relay 322 to ground, and will cause the operation of the relay 315, and establish the operation of the suceeding rectifier charge unit Z at its full-load ampere output rating.

The operation of the circuit for the Z rectifier charge unit, when this unit is removed or restored to service, is similar to the procedure outlined above for operation of the Y rectifier. The only difference in the operational function is that the relay 328 is held operated during the period that the charge unit is removed from service and will remain operated if a succeeding unit is in operation at the time this unit is restored to service, otherwise the relay 328 will release.

*Charge-float control*

The fuses 415, in Fig. 4, are supplied over a separate set of leads which are connected directly to the battery. The fuses 415 supply the voltage-relay 404, and the voltage-control potentiometer circuits of each rectifier charge unit.

When the "float-charge" key 416 is in the charge-operational position, the circuit operation is similar but the battery should be operated at a higher voltage level in order to permit it to receive a charge.

Charge unit fuse failure

If a fuse associated with any rectifier charging unit should operate, the associated fuse relay 337 or 338 or 339 will operate and will lock operated under control of the leads 340 or 341 or 350. A fuse relay 337 or 338 or 339, operated, connects battery to the lead 309 to the alarm circuit and will originate an audible and/or visual alarm. The particular fuse relay, operated, will also connect ground from its lowest contact to insure the operation of an associated relay 301 or 305 or 317, and will remove a particular rectifier charge unit from service, and transfer the control in order that a succeeding rectifier charge unit may operate.

When the fuse has been replaced and ground has been removed from the particular fuse lead 340 or 341 or 350, the associated relay 337 or 338 or 339, and relay 301 or 305 or 317 will release, and restore the control circuit to a normal operational condition.

Power service failure

For the purpose of describing this feature let it be assumed that there are four rectifiers X, Y, Z and Z' in operation.

When the power supply fails the relay 400 will release and disconnect the battery from and effect the release of the relay 300, which, in releasing, will disconnect battery from the lead 302 to the X rectifier, and thus disconnect this charging unit from the load circuit. At the same time, the relay 400, released, by opening action of its central left contact will disconnect battery from left inner contact of the relay 402, and prevent the operation of the relay 403, and also by the release of the relay 400, battery and ground will be connected to the winding of the relay 411 and will cause the operation of the relay 411. The relay 411, operated, will cause the operation of relays 314 and 329 for control of the rectifiers Y and Z. Relay 329 operates from ground on the innermost left contact of the relay 411, through winding of relay 329, to battery on lowest contact of relay 328. Relay 314 operates to battery from outermost lower contact of relay 315, through winding of relay 314, outermost left contact of relay 411 to ground on lowest contact of relay 301.

The circuits of a Z' rectifier are not shown, but for purposes of illustration it may be assumed that they are similar to those of rectifier Z. The functions of the relays 328', 329', 321' and 325', not shown, are similar to those of the relays 328, 329, 321 and 325, respectively. The function of the lead 343' is similar to those of the lead 343.

Failure of the alternating-current supply, will cause the output of the Z rectifier to drop to a zero output, and a relay 328' will release and will complete a circuit from battery through contact of 328' relay, winding of a 329' relay and contact of relay 411, and will operate the 329' relay which through its contacts will release a 321' relay.

The 321' relay released will disconnect battery from the lead 343' to rectifier Z and will cause this unit to disconnect from the load and disconnect battery from the lead 325' to the rectifier Z and opens the hold circuit through the primary winding of the relay 328.

The release of rectifiers Y and Z is the same as the procedure described above, the rectifier Z is released before the release of the rectifier Y.

When the power service supply is restored, the relay 400 will reoperate and the rectifiers will reconnect to the load circuit in the same manner as was described above under the designation of "normal operation."

Adjustment of relay 330

After the relay 330 has been adjusted to meet the current flow values, the rheostat 344 is rotated to the left to its maximum position. The output of the X rectifier is raised to some predetermined value such as 40 amperes. Then the rheostat 344 is moved to the right until a position is reached at which point the relay 330 releases. When the rheostat 344 is in the latter position, the output from the rectifier X is increased slowly so as to insure that the relay 330 will operate when the rectifier output does not exceed some predetermined value such as 50 amperes. These arbitrary figures assume a total rated output of 100 amperes for each individual rectifier unit in the system.

It is to be understood that the above-described embodiments are illustrative examples and that various modifications may be made without departing from the spirit and scope of the invention.

What is claimed is:

1. In a system of distribution, the combination of alternating-current supply mains, a variable direct-current load, a first and second rectifier connected to said mains and adapted to convert an alternating-current input from said mains into a direct-current output, said rectifiers having predetermined output capacities and said first rectifier being competent to operate as a voltage-control rectifier and as a constant-current rectifier, means for feeding said direct-current output to said direct-current load, means for causing said first rectifier to operate as a voltage-control rectifier and connect to said feeding means, means for causing said first rectifier to switch from voltage-control to constant-current operation when the output from said first rectifier approaches full capacity output, means for causing said second rectifier to operate and to connect to said feeding means when the requirements of said direct-current load approach said full capacity output of said first rectifier, and means for switching said first rectifier to voltage-control operation whenever the voltage across said feeding means varies beyond certain predetermined limits.

2. In combination, alternating-current supply mains, a variable direct-current load having a storage battery connected therewith, a first and second rectifier for converting alternating-current from said mains into direct current and feeding said current to said load and said battery, said rectifiers having predetermined and variable output capacities and said first rectifier being competent to act under certain load requirements as a voltage-control rectifier and under other load requirements as a constant-current rectifier, means for causing said first rectifier to operate and supply said load, means for causing said first rectifier to switch from voltage-control operation to constant-current operation when the output approaches the full-output capacity of said first rectifier, means for causing said second rectifier to connect to said load at a predetermined capacity output when said load requirement approaches the full-output rating of said first rectifier, and means for switching said first rectifier to voltage-control operation whenever the voltage of said battery varies beyond certain predetermined limits.

3. In combination, alternating-current supply mains, a variable direct-current load having a storage battery associated therewith, a plurality of rectifiers adapted to connect to said mains and convert alternating current from said mains into a direct-current output and feed said current output to said battery and said load, said rectifiers having predetermined and variable output capacities, means for actuating a first rectifier of said plurality and causing it to feed said battery and load, means for actuating a second rectifier of said plurality and causing it to connect to said battery and load in parallel with said first rectifier when said load requirement increases above the full-output capacity of said first rectifier, said second rectifier operating at first at partial capacity output of its rated capacity output, and means for causing the operation of said second rectifier at full capacity output when said load requirement approaches the full-output capacity of said first rectifier plus the partial capacity output of said second rectifier.

4. In an automatic system of distribution, the combination of an alternating-current supply, a variable direct-current load, a storage battery connected to said load, a plurality of rectifiers adapted to connect between said supply and said battery and convert alternating current from said supply into a direct-current output to feed said load, a regulating circuit adapted for use with each of said rectifiers for regulating the outputs thereof in accordance with variations in said direct-current load, means in said circuit for connecting said rectifiers automatically between said supply and said battery, said automatic connecting means first connecting a first rectifier of said rectifier plurality so that said first rectifier operates as a constant-current and as a voltage-control rectifier in accordance with the instant voltage of said battery as determined by the instant requirements of said load and maintains the voltage of said battery at a substantially constant level, means in said regulating circuit for connecting remaining members of said rectifier plurality to said battery in predetermined partial output steps of their full-capacity outputs and in a definite connection order in accordance with variations in said direct-current load, and means in said circuit for disconnecting said remaining rectifiers in predetermined partial output steps of their full-capacity outputs from said battery in reverse order to their connection thereto and in accordance with variations in said direct-current load.

5. In a system of distribution the combination of alternating-current supply mains, a variable direct-current load, a storage battery bridged across said load, a plurality of rectifiers connectable to said battery and said load, a first rectifier of said rectifier plurality capable of operation as a constant-current rectifier when the voltage of said battery is within predetermined limits and as a constant-voltage rectifier for regulating the battery voltage when the voltage exceeds said limits, the remaining rectifiers of said plurality being capable of operation at certain predetermined capacities of their individual rated ampere outputs, and relay means for controlling the operations of said rectifiers in accordance with the instant voltage of said battery.

6. In a system of distribution, an alternating-current supply, a variable direct-current load having a storage battery associated therewith, a plurality of regulated rectifiers, a single regulating circuit adapted for use with each of said rectifiers for regulating the outputs thereof, means for connecting a first rectifier of said rectifier plurality between said supply and said battery, means for causing said first rectifier to operate as a voltage-control rectifier, means for causing said first rectifier to switch from voltage-control to constant-current operation when the output from said rectifier approaches maximum capacity output, means for connecting remaining rectifiers of said rectifier plurality automatically between said supply and said battery in a definite order of connection and in steps substantially equivalent to certain predetermined values of the output of each of said remaining rectifiers in response to increases of predetermined magnitudes in said load, and means for disconnecting said remaining rectifiers from between said supply and said battery in the reverse order of their connection thereto and in steps substantially equivalent to certain predetermined values of the output of each of said remaining rectifiers.

7. In a system of distribution, an alternating-current supply, a varying direct-current load having a storage battery connected thereacross, a plurality of rectifiers for supplying rectified current from said source to said load and battery, said rectifiers competent to operate at predetermined output levels of their full-capacity outputs and first and second rectifiers of said plurality also competent to operate both as constant-current and voltage-control rectifiers, said first rectifier switching automatically and alternately from voltage-control to constant-current operation in accordance with the instant voltage of said battery as determined by the instant requirement of said load, and said second rectifier competent to operate as a constant-current rectifier until such time as said first rectifier is removed from service, and means for causing said second rectifier to switch automatically and alternately from constant-current operation to voltage control in accordance with the instant voltage of said battery as determined by the instant requirements of said load when said first rectifier is removed from service.

8. In an automatic system of distribution, the combination of alternating-current supply mains, a battery, a variable direct-current load connected across said battery, a plurality of rectifiers connected to said mains and said battery and adapted to convert an alternating-current input from said mains into a direct-current output, first and second rectifiers of said plurality being competent to operate as voltage-control rectifiers and as constant-current rectifiers, means for feeding said direct-current output into said battery, means for causing said rectifier plurality of operate and connect to said battery in the predetermined output steps and sequence of connection, means for causing said first rectifier to switch automatically and alternately from constant-current operation to constant-voltage operation in accordance with the voltage of said battery, said first rectifier correcting its output to maintain a predetermined voltage across said battery, and said second and succeeding rectifiers operating at predetermined output capacities under control of said first rectifier until such time as said first rectifier is removed from service, and means for causing said second rectifier to assume the operational functions performed by said first rectifier when said first rectifier is removed from service, said succeeding rectifiers operating thereafter at predetermined output capacities under control of said second rectifier.

9. In an automatic system of distribution, the combination of a source of alternating-current, a plurality of rectifiers connected across said source, a varying load circuit connected to the output of said rectifiers, means for causing a first rectifier of said plurality to connect to said load and to operate at full-ampere output, means for causing a second rectifier to connect to said load at a predetermined partial output rate of its full-output capacity when the output of said first rectifier is insufficient for the requirements of said load, means for causing said first rectifier to switch from constant-current regulation to constant-voltage operation if the added charging capacity due to the addition of said second rectifier is above the requirement of said load, means for causing said first rectifier to switch to constant-current operation when the output of said first rectifier approaches full-capacity output, and means for causing said second rectifier to increase its partial output to full-capacity output when the outputs of said first rectifier plus said predetermined partial output rate of said second rectifier are insufficient to satisfy the requirements of said load.

HARVEY T. LANGABEER.

No references cited.